Patented Mar. 21, 1944

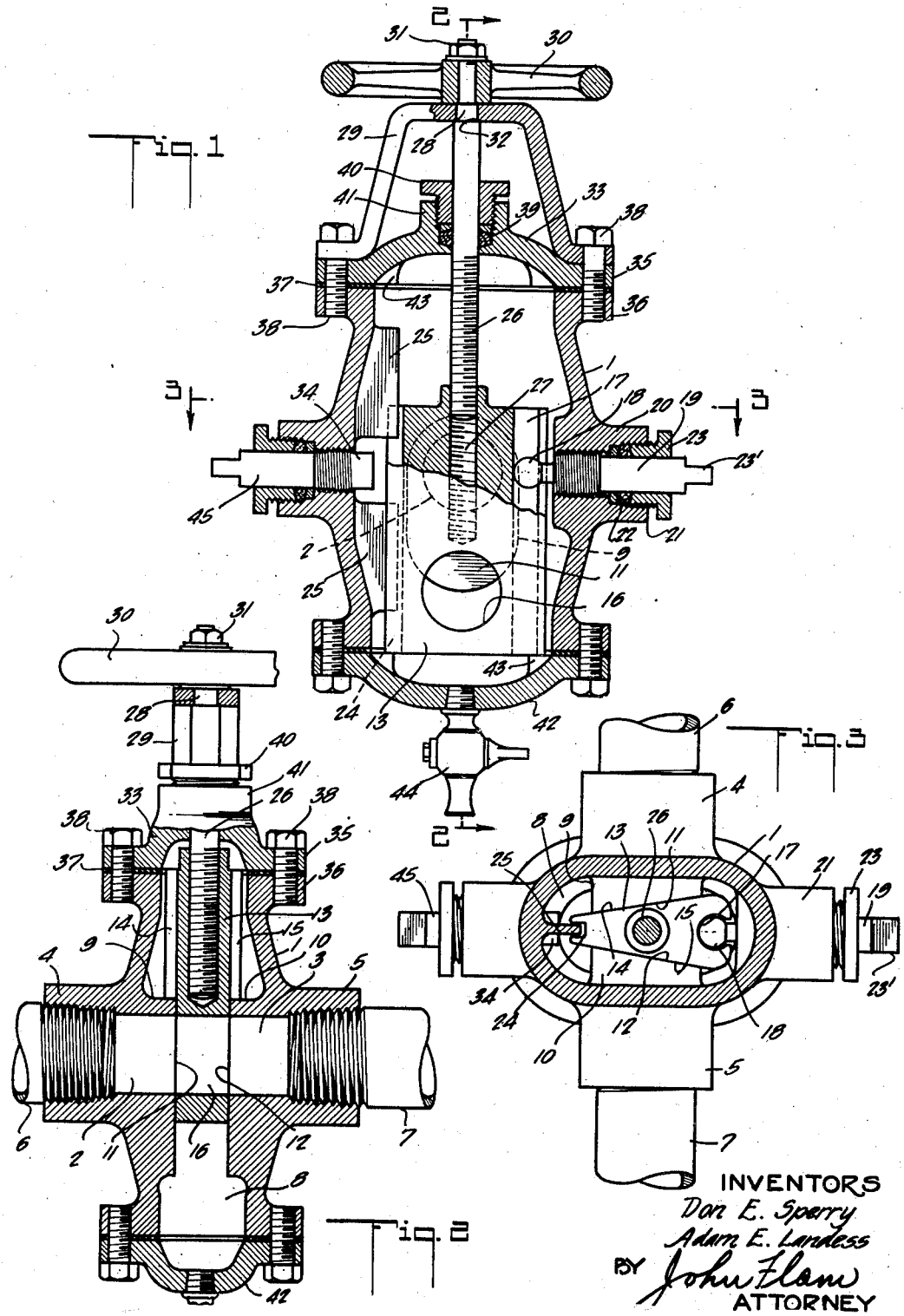

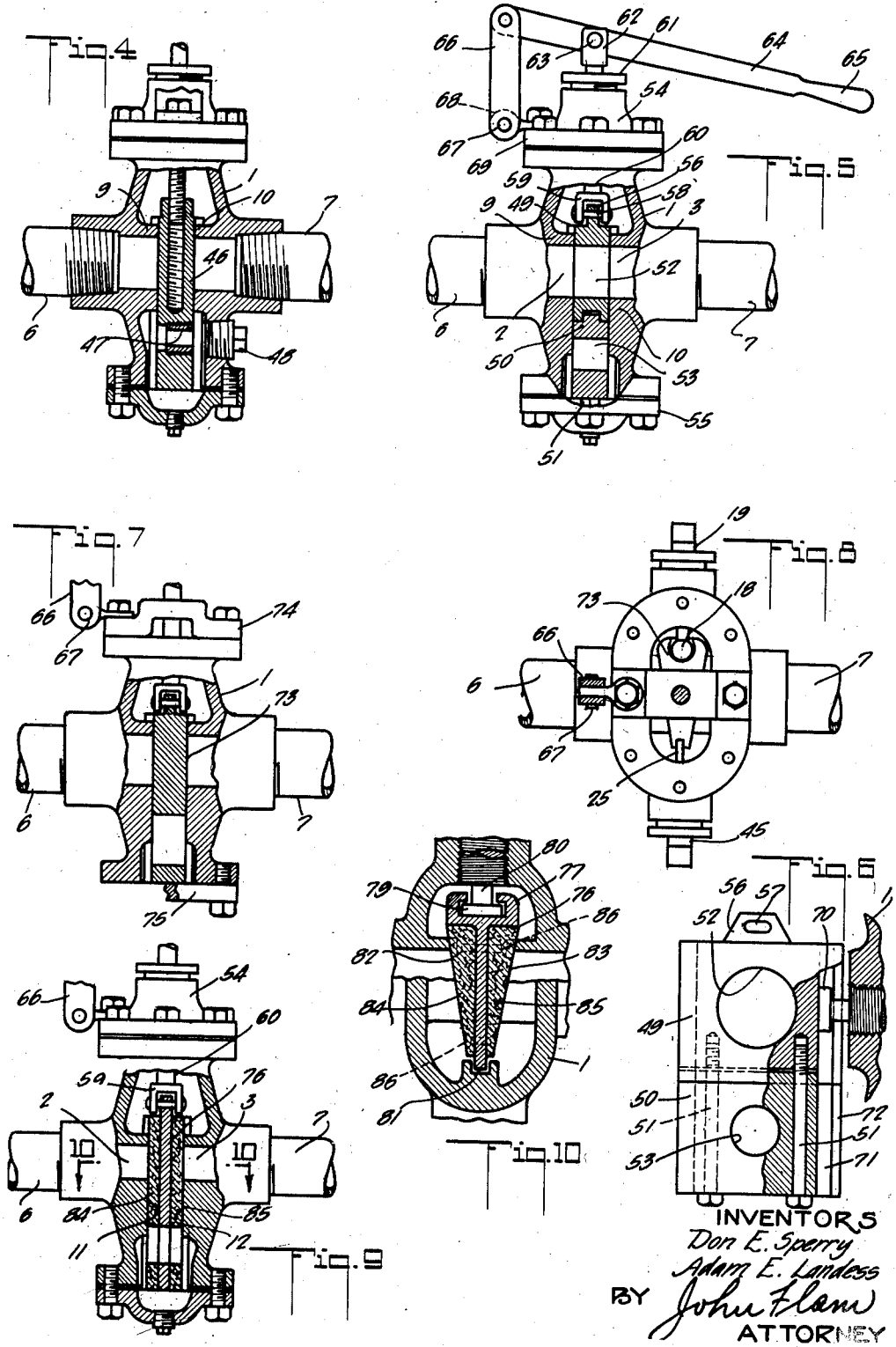

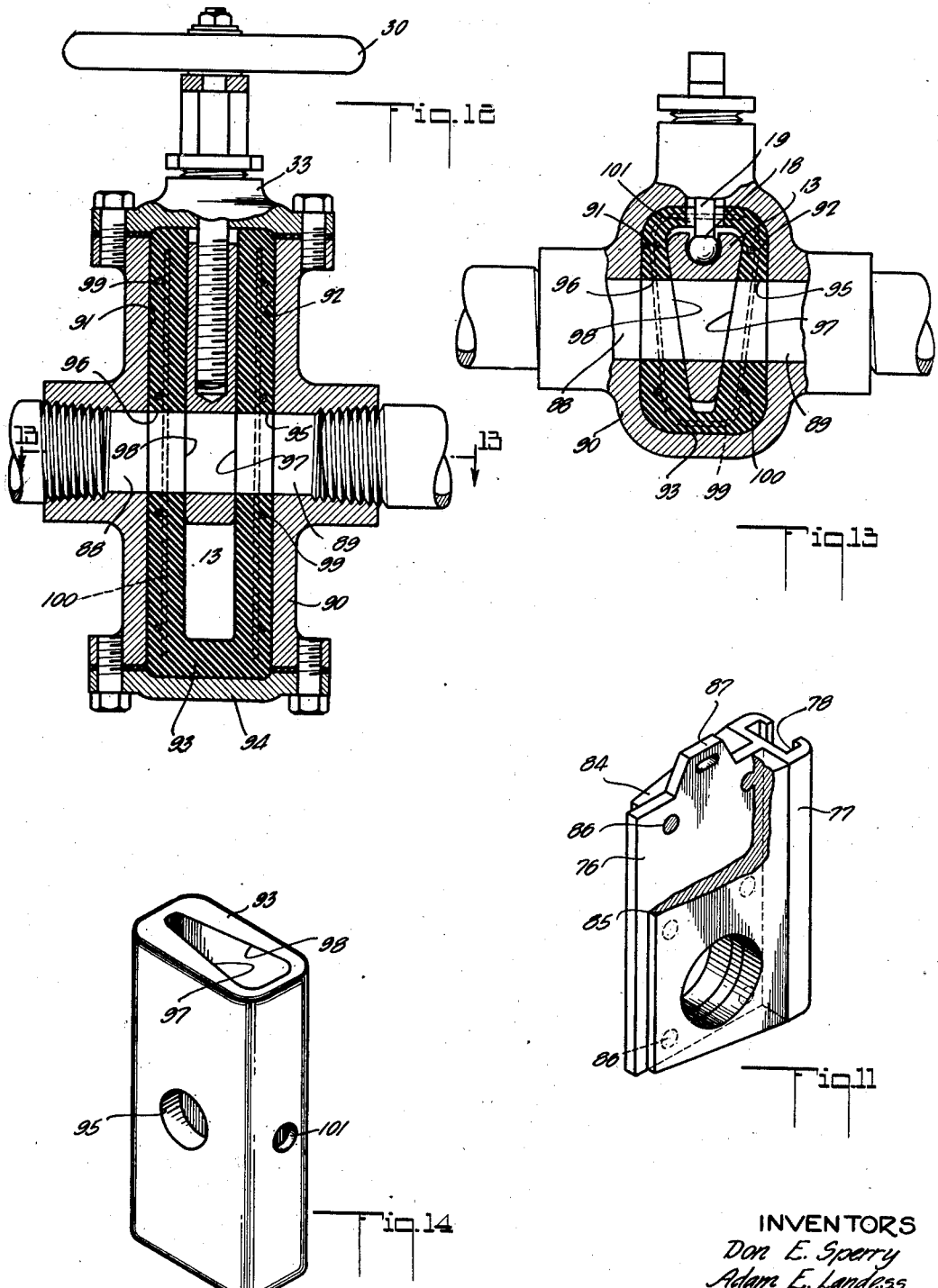

2,344,747

UNITED STATES PATENT OFFICE 2,344,747

FLUID FLOW CONTROL MECHANISM

Donald E. Sperry, Whittier, and Adam E. Landess, Long Beach, Calif., assignors of one-fourth to Roland R. Crum and one-fourth to James K. Burkhart, both of Whittier, Calif.

Application July 15, 1940, Serial No. 345,452

6 Claims. (Cl. 251—59)

This invention relates to apparatus for controlling the flow of fluids, such as oil or gas, or asphalt, and more particularly to apparatus that utilizes a movable gate between fluid passageways.

Control devices of this general character have been proposed and used in the past. They may take the form of a gate valve, operated as by levers or a lead screw, to be optionally positioned so as to interrupt the flow of fluid between inlet and outlet passageways, or to permit passage of fluid past the gate. Many liquids, such as water or crude oil usually carry in suspension foreign matter that may seriously interfere with the proper setting of the valve. This foreign matter is also usually of an abrasive character, having destructive effects upon the contacting surfaces of the valve.

It is one of the objects of this invention to obviate such occurrences, and particularly by the aid of a simplified and improved valve structure.

It is another object of this invention to provide a valve structure that may be easily renewed or repaired.

It is still another object of this invention to provide a fluid control mechanism the principle of which may be very readily utilized not only for a valve, but also for such purposes as a flow bean, an orifice fitting or a slip blank device.

It is still another object of this invention to ensure against "freezing" of the valve closure, by making it possible first to unseal the gate positively, before the valve gate is moved in a direction transverse to the passageways controlled by the valve.

It is still another object of this invention to make it possible to operate the controlling member or gate to open or closed position and to ensure that the member will be maintained properly in any of its positions, while yet ensuring that it can be moved as desired without excessive frictional opposition.

It is still another object of the invention to make it possible, without dismantling the apparatus, to substitute or replace the control member or gate so as to vary the aperture or orifice of discharge.

This invention possesses many other advantages, and has other objects which may be made more easily apparent from a consideration of several embodiments of the invention. For this purpose there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings:

Figure 1 is a view, mainly in longitudinal section, of a device incorporating the invention, the device being shown in closed position;

Figs. 2 and 3 are sectional views taken along correspondingly numbered planes of Fig. 1, Fig. 2 illustrating the device in open position;

Fig. 4 is a view similar to Fig. 2 of a modified form of the invention;

Fig. 5 is a view similar to Fig. 2, of a further modified form of the invention;

Fig. 6 is a fragmentary view of the apparatus illustrated in Fig. 5;

Fig. 7 is a view similar to Fig. 2, of a still further modified form of the invention;

Fig. 8 is a top plan view of the apparatus illustrated in Fig. 7, part of the apparatus being broken away;

Fig. 9 is a view similar to Fig. 2, of a still further modified form of the invention;

Fig. 10 is a sectional view taken along plane 10—10 of Fig. 9;

Fig. 11 is a pictorial view, partly broken away, of a control member utilized in connection with the form of the invention illustrated in Figs. 9 and 10;

Fig. 12 is a view similar to Fig. 2, of a still further modified form of the apparatus;

Fig. 13 is a sectional view taken along plane 13—13 of Fig. 12; and

Fig. 14 is a pictorial view of a liner that may be utilized in the form of the invention illustrated in Figs. 12 and 13.

Figs. 1, 2 and 3 illustrate the invention as applied to a gate valve for the control of liquids or gases. It may be effectively utilized in the oil industry, as for example the control of viscous or plastic material, such as crude oil, mud fluid or the like; of gasoline or other petroleum products.

There is shown a valve body 1 which may conveniently be made as a casting. This valve body 1 is provided with passageways 2 and 3 which may form inlet and outlet openings. For convenience in inserting the valve body in a line of pipe, opposed exterior bosses 4 and 5 may be provided on the body 1, into which may be threaded the pipes 6 and 7.

As shown most clearly in Figs. 2 and 3, the valve body defines a narrow space 8. From opposite walls of this space extend the raised bosses 9 and 10. These bosses provide opposed converging flat surfaces 11 and 12. The space 8 within the body forms a clear chamber around these opposed converging surfaces. The passageways 2 and 3 open in these surfaces. Accordingly the device when utilized as a gate valve can be placed in either open or closed position by the aid of a control member seated upon these converging surfaces 11 and 12. Such a control member 13 may be placed between the converging surfaces 11 and 12, and may be provided with corresponding surfaces 14 and 15. The control member 13 is provided with a through port 16 adapted to be placed in matching registry with the openings of passageways 2 and 3 in the surfaces 11 and 12. In the open position of Fig. 2, the openings and the port 16 are shown in alinement, providing a smooth uninterrupted passageway through the valve body 1 and between the conduits 6 and 7.

The positioning of the control member 13 in either open or closed position is effected by providing a mechanism for moving the control members transversely to the openings in the surfaces 11 and 12, as well as mechanism for moving it in a direction to urge the control member 13 to the seating and sealing position illustrated in Figs. 2 and 3. As shown most clearly in Fig. 3, a force exerted upon the member 13 toward the left will cause it to be wedged between the surfaces 11 and 12 and to seat firmly thereupon. This seating and sealing force can be applied when the control member 13 is in the open position of Fig. 2, as well as when it is in the closed position of Fig. 1. The mechanism for moving the control member in the direction transverse to the openings will be described hereinafter.

The means for urging the member 13 to its seating and sealing position may be effected in any of a number of ways. Thus for example the right hand edge of member 13 may be provided with a generally circular longitudinal groove 17. Within this groove is accommodated the spherical end 18 of an operating stem 19, available for operation exterior of body 1. This stem 19 is shown as having a threaded portion 20 (Fig. 1) accommodated in corresponding threads cut in the wall of body 1. A packing gland structure may be provided around operating stem 19 for maintaining the body 1 sealed around the stem 19. For this purpose an exterior boss 21 is provided through which the stem 19 extends. Packing washers 22 are shown disposed around the stem 19 and are held in sealing relation by the aid of the packing gland 23. This gland 23 may be threaded within the boss 21.

For facilitating manipulation of the stem 19 it may be provided with a non-circular or flattened end 23'. This may accommodate a wrench by the aid of which the stem 19 may be turned to advance it or retract it with relation to the threads in the wall of body 1. Due to the fact that the circular groove 17 extends along the entire edge of the control member 13, the operating stem 19 may be effectively utilized to urge this control member toward the left into sealing relation irrespective of the particular position of the control member 13 in a direction transverse to passageways 2 and 3.

To assist in guiding the control member 13 in a direction transverse to the openings in the bosses 9 and 10, the left hand edge of the member 13 may be provided with a guiding groove 24 (Figs. 1 and 3). Within this groove extends the right hand edge of a pair of guiding vanes 25 shown as cast integrally with the wall of body 1.

Movement of the control member 13 to aline the valve apertures or to place them out of alinement, is permitted whenever the stem 19 is retracted toward the right so as to free the control member 13 from the converging surfaces 11 and 12. This transverse movement may be obtained in any desired manner. For example, a lead screw 26 may be used. This lead screw is shown as engaging corresponding threads formed in an aperture 27 within the control member 13. In order to permit the slight seating and unseating movement of the control member 13, the threads of lead screw 26 have considerable clearance in the threads of the aperture 27. The lead screw 26 is shown as having a reduced portion 28 serving as a bearing within a strap 29 forming a part of the structure. The upper end of the lead screw 26 carries the operating hand wheel 30. This hand wheel may be held in place as by the aid of a nut 31 threaded on the end of the lead screw 26. The lead screw is restrained against axial movement by the hub of the hand wheel 30, and by the shoulder 32 formed by the reduced portion 28 of the screw 26.

The screw 26 passes out of the valve body 1 and the space in the valve body is maintained sealed by the aid of a cap 33. This cap 33 has a flange 35 cooperating with the body flange 36. A sealing gasket 37 may be interposed between these flanges; and screws 38 serve to tighten the flanges against each other. A pair of these screws may also be utilized, as illustrated in Fig. 1, for holding the strap 29 in position.

A packing gland structure is provided through cap 33 for maintaining a seal around the screw 26, where the stem of screw 26 passes through the cap. For this purpose there are provided the sealing washers 39 and the packing gland 40 threaded in the boss 41.

The lower end of the body 1 is similarly sealed by the cap 42. The caps 33 and 42 may be provided with inwardly directed stop members 43 serving as limits for the vertical movement of the control member 13.

The operation of the device as thus far described may be summarized. Assuming that the device is in the closed position of Fig. 1, the valve structure may be moved to open position by the following steps. The operating stem 19 is caused to move to the right, to release the sealing force operating to seat the member 13 on the surfaces 11 and 12. Thereafter the hand wheel 30 may be operated to lift the control member 13 to the position of Fig. 2. Thereafter, the stem 19 may again be operated to apply a seating force upon the control member 13. In the open position, the port 13 matches the openings in the surfaces 11 and 12 to form a continuous smooth passageway for the flow of liquid.

The operation of the seating mechanism including the stem 19 is independent of the operation of the lead screw 26. When the control member 13 is seated by operation of the stem 19, in either the closed or open position, the space 8 within the body 1 is completely shut off from the passageways 2 and 3. Accordingly there is no substantial accumulation of mud or other foreign matter within the valve body 1 that may interfere with the free movement of the control member 13, once it is unseated. It is only in the unseated position that there may occur a slight accumulation of liquid within the body, past the control member 13. Since it is only during valve operation that this can occur, the extent of accumulation is not material. Furthermore, the passage of the liquid when member 13 is unseated, is transverse to the surfaces 11 and 12, and assists in flushing and cleaning these surfaces. Whatever accumulation of liquid may occur in the valve body 1 may be occasionally drained through a cock 44 threaded into the lower cap 42.

The control member 13 may have a tendency to "freeze" in its seat. This may be due to the character of the liquid controlled by the device, such as heavy asphalt or other viscous material, or it may occur for other reasons. In that event, a mere retraction of the stem 19 to release the seating force upon the control member 13 is ineffective to free this control member 13 from its seat. In order to ensure that the member 13 may be positively freed, even if stem 19, for example, may be inoperative, a supplemental mechanism is provided. In this instance this mechanism takes the form of another operating stem 45 passing through the left hand wall of the body 1. This operating stem is similar to operating stem 19. Its inner end 34 is adapted to contact the left hand edge of the control member 13 and urge it toward the right to unseat it. Ordinarily, this stem 45 is moved entirely out of contact with the control member 13. The operating stem 45 may thus serve to "crack" the valve open, should occasion require.

When the valve is placed in either open or closed position and the control member 13 is seated by operation of the stem 19, the caps 33 and 42 may be removed without disturbing the controlling function of the valve. The lead screw 26 may also be removed by threading it out of the control member 13. Thus the entire interior of the valve body 1 is laid open to inspection to detect any leaks or the like, and for cleaning or servicing in general.

In the form just described, the apparatus is shown as utilized as a gate valve. It may be utilized, however, in other ways. One of these ways is illustrated in Fig. 4. In this form it serves to provide a control for the rate of flow of liquid, such as oil, between the conduits 6 and 7. The control member 46 in this instance, instead of being provided with a port 16, is shown as provided with a "flow bean" 47. This flow bean 47 may be appropriately threaded into the control member 46.

If it is desired to change the rate of flow by changing the flow bean opening, it is a simple matter to remove and replace the flow bean 47. For this purpose the apparatus may be placed in the closed position of Fig. 4, with the control member 46 seated and sealed upon the bosses 9 and 10. Then a plug 48 provided in the wall of body 1 may be removed to obtain access to the flow bean 47. The flow bean may be provided with appropriate sockets for the accommodation of a socket wrench to unscrew it from the control member 46 through the aperture formed by the removal of the plug 48. A new flow bean may be tightened in place and the plug 48 reinserted. Then by operating the control member 46 to open position, the flow bean 47 serves to provide a control orifice of the desired size.

It may at times be desirable to provide the control member or gate with a plurality of openings of different sizes which may be optionally placed in alinement with the passageways 2 and 3. In the form of the invention illustrated in Figs. 5 and 6, this may be readily effected; furthermore, the sizes of these orifices or ports may be altered without taking the valve out of operation. For this purpose the control member is shown as having an upper portion 49 and a lower portion 50. At the contacting edges a dovetail joint may be provided, as illustrated in Fig. 5. The two portions may be held firmly together as by the aid of the bolts 51 passing through the lower portion 50 and threaded into the upper portion 49. Both the upper and lower portions 49 and 50 may be provided with ports 52 and 53 respectively of different sizes if desired. It is a simple matter to replace either of the portions 49 or 50 while the other portion is in active relation with the passageways 2 and 3. This may be done by removal of the caps 54 and 55 (corresponding to the caps 33 and 42 of the form shown in Fig. 1). When this is done the bolts 51 may be removed and either one or the other of the parts 49 or 50 may be replaced while the other part is in active relation with the passageways 2 and 3.

A slightly different form of mechanism for moving the control member 49, 50 in a direction transverse to the passageways 2 and 3 is illustrated. In this case, the upper portion 49 of the control member is provided with an ear 56 having a slot 57 therein. This slot is shown as engaged by a cross pin 58 accommodated in a clevis 59. This clevis 59 is joined to a stem 60 passing through the gland structure 61 and the cap 54. The upper end of the stem 60 is provided with a clevis 62 through which the pin 63 passes. This pin 63 also passes through the hand lever 64 accommodated between the ears of the clevis 62. The handle 65 of the hand lever may be raised or depressed for moving the stem 60 in a vertical direction. For this purpose, the left hand end of the lever 64 is shown as pivoted to the link 66. The lower end of this link 66 is pivoted on a pivot pin 67 having a stationary axis. This pivot pin may be supported in an eye 68 fastened to the top of flange 69 of the cap 54.

The operating stem for seating the control member may include in this case a cylindrical head 70 (Fig. 6) which may be accommodated in a groove 71 having overhanging flanges 72. As in the form illustrated in Fig. 1, the axis of the operating stem 19 is normal to the axis of the passageways 2 and 3. These two axes fall in a common plane normal to the axis of the operating screw 26 or stem 60. In this way it is assured that the force urging the control member to its seat will operate most effectively neighboring the passageways in the body 1.

The apparatus may be utilized for optionally sealing against the passage of liquid in a conduit such as an oil pipe line, as by a "slip blank." In such instances it is important to determine whether there is any leak whatever past the closure. In the present instance this can be effectively accomplished since the caps such as 33 and 42 of Fig. 1 may be omitted. Such a form of device is illustrated in Figs. 7 and 8. Here the control member 73 may be operated in the same manner as illustrated in Figs. 5 and 6. In this case, however, the caps 33 and 42 are omitted, exposing the contacting edges of the control member 73. Instead of the cap 33, a strap 74 may be utilized by the aid of which the link 66 may be supported. In lieu of the cap 42, a straight strap 75 may be provided, to provide a limit for the downward movement of the slip blank member 73.

In some instances it may be advisable to provide a control member utilizing a non-metallic facing or lining such as rubber or the like, that may be relatively fluent and which may seat more securely upon the surfaces 11 and 12. Such a form of control member is illustrated in Figs. 9, 10 and 11. In this instance the body of the control member is formed by a relatively narrow flat plate 76, with opposite parallel plane surfaces. One of its edges is formed with a T head 77 transverse to the member 76 and forming a longitudinal slot 78. In this slot the head 79 of the operating stem 80 may extend. The other edge of the control member may be extended to be guided within the longitudinal groove 81 formed in the wall of the body 1.

The operating surfaces of the control member are formed by the sloping surfaces 82 and 83 of the rubber layers 84 and 85. These rubber layers or liners form a laminated structure with the central portion 76. A plurality of rivets or other fastening means 86 may pass through the layers 84, 76 and 85. For connection to the operating stem 60, the portion 76 may be provided with the slotted ear 87.

The rubber layers 84 and 85 are particularly resistant against abrasive particles that may be carried by the liquid being controlled. They are readily replaceable if worn out.

Instead of providing a rubber or other non-metallic material for the control member, it is possible in addition to provide such a layer or liner for the stationary seat surfaces. This form of the invention is illustrated in Figs. 12, 13 and 14.

In this form of the invention the control member 13 is identical in construction with the control member illustrated in Fig. 1. As in the form of Fig. 1, a hand wheel 30 is utilized for moving the control member in a direction transverse to the passageways 88 and 89 formed in opposite walls of the body 90.

In this instance, however, the body 90 is provided with plane, parallel surfaces 91 and 92, in which the passageways 88 and 89 open. Inserted within the hollow body 90 is a non-metallic or rubber liner 93. This non-metallic liner extends from the cap 33 downward to the lower closure cap 94 and is held firmly within the body 90 by the aid of these two caps. As shown most clearly in Fig. 14, the liner 93 in general is in the form of a rectangular sleeve having a vertical central aperture therein extending almost to the bottom of the sleeve. The liner is further provided with openings such as 95 and 96 adapted to be alined with and matching the openings of the passageways 88 and 89. The central aperture is defined by the converging surfaces 97 and 98 formed to correspond to the surfaces of the control member 13. It is between these surfaces that the control member 13 is movable, in the same manner as described in connection with Fig. 1. The liner 93 is preferably formed as by molding in integral fashion. If desired, reinforcing bars or wires of metal such as 99 and 100 may be utilized. The wires 99 may be in the form of loops extending annularly within the lever; and wires 100 may be generally arranged longitudinally of the lever, and permanently connected to loops 99, as by welding or the like. In order to permit the passage of the head 18 of the operating stem 19 to the control member 13, the liner 93 may be provided with an aperture 101.

In this form of the invention, replacement after undue wear of the liner 93 is a relatively simple matter. The caps 33 and 94 may be removed, after which the liner 93 may be passed downwardly or upwardly out of the body 90, and a new liner substituted.

What is claimed is:

1. In apparatus of the character described, a body, said body having fluid passageways, a non-metallic liner supported in the body and forming opposed converging flat surfaces with openings communicating with the passageways, a control member having surfaces adapted to seat upon said converging surfaces, the control member having a port opening therethrough, adapted to cooperate with and match said passageway openings to establish communication through said passageways, means for moving said control member in a direction transverse to the openings to position the port in or out of matching relationship with the passageway openings, and means for moving the control member to seat and seal the corresponding surfaces of the liner and the member.

2. In apparatus of the character described, a body, said body having fluid passageways, rubber liners supported in the body and forming opposed converging flat surfaces with openings communicating with the passageways, a control member between said converging surfaces, and having surfaces adapted to seat upon said converging surfaces, as well as a port adapted to cooperate with said openings to establish communication between the passageways, means for moving said control member in a direction transverse to the openings for positioning the port in or out of cooperative relation with the passageways, and independent means for moving the control member to cause the corresponding surfaces of the control member and the liners to seat and seal.

3. In apparatus of the character described, a body, said body having fluid passageways, a non-metallic liner within said body, said liner having a pair of opposed converging flat surfaces and openings communicating with the passageways, a control member between said converging surfaces, said control member having surfaces adapted to cooperate with said converging surfaces, means for moving said control member in a direction transverse to the openings, and means for moving the control member to seat and seal the corresponding surfaces of the liner and the control member.

4. In apparatus of the character described, a body having a pair of opposite converging flat surfaces, said body providing a clear space around the edges of the converging flat surfaces, a control member between said converging flat surfaces and having flat surfaces adapted to cooperate with and seat upon said converging surfaces, means supported by aid of the body for moving said control member in a rectilinear direction transverse to the openings, and for maintaining said control member in any position to which it is moved in its rectilinear path, and a movable device supported by aid of the body for positively urging the control member in a rectilinear direction to urge the control member positively toward and from said converging surfaces to seat and seal, as well as to unseat and unseal, there being a channel recess forming the operative connection between said movable device and the control member, said connection being capable of operation irrespective of the relative transverse position of the control member, and the operating portion of said movable device having limited freedom of movement transverse to the control member.

5. In apparatus of the character described, a body having a pair of opposite converging flat surfaces, there being passageways opening in the surfaces, said body providing a clear space around the edges of the converging flat surfaces, a control member between said converging flat surfaces and having flat surfaces adapted to cooperate with and seat upon said converging surfaces, means supported by aid of the body for moving said control member in a rectilinear direction transverse to the openings, and for maintaining said control member in any position to which it is moved in its rectilinear path, a movable device supported by aid of the body for positively urging the control member in a rectilinear direction to urge the control member positively toward and from said converging surfaces to seat and seal, and a supplemental unseating means supported by said body and adapted to engage an edge of the control member to move said member to unseating position.

6. In apparatus of the character described, a valve body having a pair of opposite converging surfaces, there being passageways opening in the surfaces, a control member between said converging surfaces and having surfaces adapted to cooperate with and seat upon said converging surfaces, said control member being formed of a pair of readily separable parts, each having surfaces capable of cooperating with said body surfaces to control the passageways in said body surfaces, while the other part is inactive and available for removal and replacement, means for moving said control member transversely of the passageways so as optionally to render each part active, and means for urging said active part into sealing position while the inactive part may be removed and replaced.

DONALD E. SPERRY.
ADAM E. LANDESS.